United States Patent Office 3,427,615
Patented Feb. 11, 1969

3,427,615
DOPPLER RADAR ALTIMETRY APPARATUS
Theodore Hubka, Briarcliff Manor, N.Y., assignor to General Precision Systems Inc., a corporation of Delaware
Filed Dec. 6, 1966, Ser. No. 599,459
U.S. Cl. 343—14
Int. Cl. G01s 9/24
12 Claims

ABSTRACT OF THE DISCLOSURE

An apparatus for automatically calibrating the altimetry signal derived from a Doppler echo by removing therefrom the internal phase delay error products generated during system processing. The processed echo signal comprising both altitude phase delay and internal phase delay components is sampled and stored in a memory loop during a finite time interval. At the termination of this interval the antenna is short-circuited for an equivalent period of time and the transmitted signal is channeled directly through the system for the purpose of accumulating the same internal delay errors the actual echo signal would. At an appropriate point a simulated Doppler return signal is inserted and mixed with this signal thus producing an accurate replica of the processed echo signal. Since this simulated echo signal or calibrate signal as it will be referred to below is directly routed through the system from the transmitter it does not have any external phase delay component corresponding to measured altitude. On the contrary, the calibrate signal contains only a single phase shift component representing the internal phase delay error generated by the system itself. The processed calibrate signal is then stored in a second memory loop during its sampling interval. The instantaneous condition of each loop is subsequently compared in a differential comparator unit wherein the internal delay component in the received signal is cancelled or washed out by the internal delay component in the calibrate signal. As a result, the differential output comprises only the relatively pure external delay component which is, of course, proportional to measured altitude.

Brief summary of the invention

Airborne Doppler radar altimeter systems ae known in which a narrow band of frequency modulated microwave energy is directed vertically from the aircraft toward the earth. The backscattered return energy is received aboard the aircraft and the corresponding signal is demodulated to a zero beat frequency signal by heterodyning it with a portion of the transmitter signal. This results in a heterodyned product carrier theoretically at zero frequency, and a series of sidebands centered at multiples of the modulation frequency. Each sideband actually consists of two fairly broad spectra equally spaced above and below each multiple frequency due to Doppler and other effects, which little or no signal at the multiple points. The first order sideband pair, centered at a frequency equal to the modulation frequency is then selected and isolated through a filter. This sideband pair is subsequently frequency doubled, resulting in a double frequency sideband, together with a sharp, single frequency signal at exactly twice the modulation frequency. This single frequency signal is then segregated by filtering and its phase is compared with a reference phase secured from the transmitter. The phase difference obtained is directly proportional to the aircraft altitude.

In systems of this type, however, it has been found that the signal being processed in the altimetry channel suffers from additional accumulative phase shift errors due to the influence of the various system components theron, particularly the narrow band filtering networks. In fact, at extreme system conditions such as at low altitudes, for example, the phase shift errors generated internally by the system are relatively much greater in magnitude than are the measured altitude delay signals and therefore in the absence of means for calibrating the processed signal, system performance may be downgraded quite severely.

The present invention, therefore, contemplates as improved radar altimeter system incorporating means for automatically calibrating the external altitude delay signal by eliminating or cancelling the internal phase delay error product generated by the system's components per se. In addition, means are provided for extracting velocity information from the same sideband yielding the altimetry information, thus producing an economical and efficient altimeter system capable of complete system integration in a Doppler navigator.

Accordingly, it is the primary purpose of this invention to provide a radar altimeter capable of improved performance under extreme environmental conditions.

It is yet another object of this invention to incorporate in a radar altimeter means for cancelling out the accumulative internal phase delay errors inherently produced by the altimeter components.

It is still another object of this invention to provide an altimeter system having no internal phase delay error and at the same time being adapted to yield Doppler velocity information as well as altimetry information.

Additional objects and advantages of the invention will be apparent from a study of the following detailed description of the preferred form of the invention, read in connection with the accompanying drawings wherein.

FIGS. 3A–H and FIGS. 4A–B are graphical representations of the signals present at the output of the various components in the altimeter system according to the present invention.

Detailed description of the invention

Figure 1:
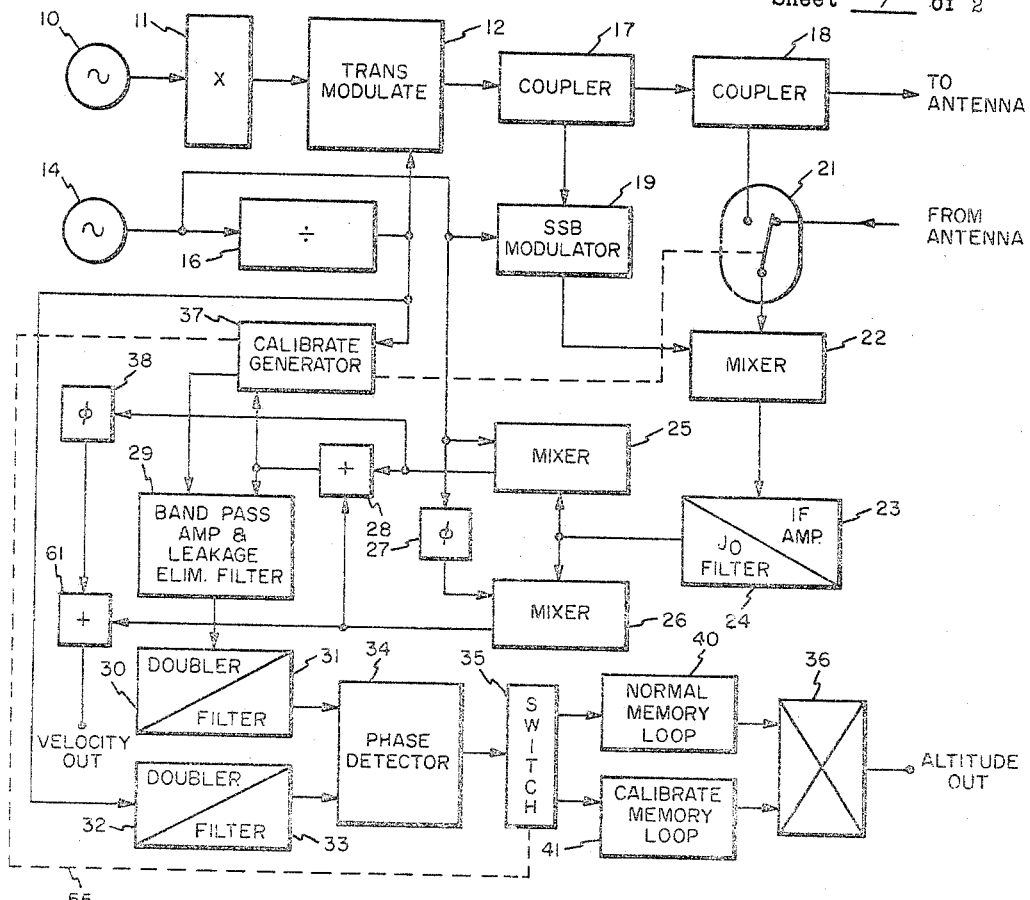
FIG. 1 is a block diagram of the altimeter system according to the concepts of the invention.

Referring now to FIG. 1, a crystal controlled oscillator 10 feeds an RF voltage into frequency multiplier 11 which multiplies the RF frequency up into the microwave region and then feeds this voltage at a frequency $\omega_0$ to transmitter-modulator 12. A second crystal controlled oscillator 14 generates a second RF voltage and feeds same into frequency divider 16. The output voltage of divider 16 has a relatively low frequency, $\omega_{mod}$, which is then fed to the transmitter-modulator 12 for frequency modulating the microwave signal therein in a known manner. The resulting FM microwave signal is then fed through conventional waveguide couplers 17, 18 to a conventional antenna system wherein a thin beam of frequency modulated energy is directed towards the earth. Simultaneously, coupler 17 diverts a small portion of the frequency modulated microwave energy into conventional single sideband modulator 19 to which latter is also being fed the intermediate frequency RF voltage ($\omega_{IF}$) produced by the second crystal controlled oscillator 14. The output of modulator 19 is then fed to receiver-mixer 22 where it is heterodyned with the echo signal fed into the mixer-receiver from the antenna via microwave switch 21.

Figure 3A:
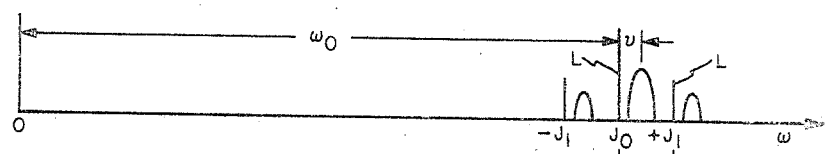

As shown in FIG. 3A, the echo signal may be visualized in the frequency domain as comprising single frequency spikes L at the carrier frequency, $\omega_0$, and at each higher order sideband point ($\omega_0 \pm \omega_{mod}$, $\omega_0 \pm 2\omega_{mod}$ ... etc.). These spikes represent unwanted leakage signals always present from the transmitter. Adjacent each leakage spike is a signal envelope having a spectral frequency distribution. The latter results from the familiar Doppler shift of the backscattered energy as well as spurious modulations, noise, and the like. Thus, the quantity $\nu$ representing the Doppler shift frequency can be seen in FIG. 3A as the distance between each leakage spike L and the center frequency of the latter's associated spectral envelope. It will be obvious to those skilled in the art that the transmitter signal and therefore the echo signal actually includes many orders of sidebands, although only the $J_0$ and $J_1$ sidebands have been shown. The reason for this is that altitude and velocity information are extracted from the first order sideband ($J_1$) and therefore to show the other sideband products ($J_2$, $J_3$ . . . $J_N$) would only complicate matters without contributing to a more complete understanding of the invention. Therefore, it will be assumed that the echo signal is passed through a filter (not shown) after it emerges from mixer 22 and all sideband products but for the $J_0$ and $J_1$ sidebands are removed therefrom. Nonetheless, it is to be understood that there is nothing magical about the first order sideband and that the altitude and velocity information could theoretically be obtained equally as well from any preselected sideband of higher order. The important thing to note is that both velocity and altitude information are extracted from the same sideband whereas in the prior art it has heretofore been necessary to use separate sidebands respectively.

Figure 3B:
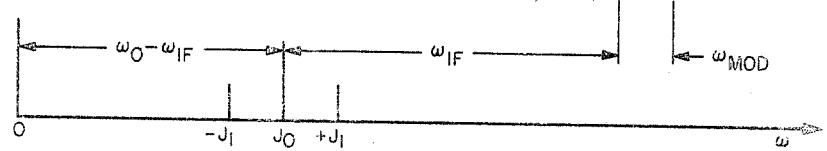
Figure 3C:
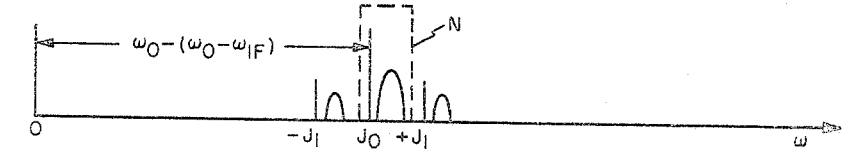

Turning to FIG. 3B, the FM signal available at the output of modulator 19 is shown to comprise a carrier frequency surrounded by two first order sidebands, the latter carrier frequency being downshifted relative to the frequency of the transmitted carrier frequency, however, by an amount equal to the frequency of the voltage output of oscillator 14. Therefore, when the output of modulator 14 ($\omega_0 - \omega_{IF}$) is heterodyned with the received echo signal ($\omega_0$) in mixer-receiver 22 the signal represented in FIG. 3C is produced. Inspection of the latter will show that the received echo signal has been sidestepped to an intermediate frequency ($\omega_{IF}$) since the latter is equal to the heterodyne difference product between the carrier frequency of the received signal and the carrier frequency of the voltage output of modulator 19. That is:

$$\omega_0 - (\omega_0 - \omega_{IF}) = _{IF} \quad (1)$$

The primary reasons for sidestepping the echo signal to the intermediate frequency, $\omega_{IF}$, are twofold. First it produces a signal having an optimum signal-to-noise ratio and secondly, it permits the use of relatively simple and therefore inexpensive filtering networks for the filtering process to be described presently.

After being amplified in IF amplifier 23, the output signal from receiver-mixer 22 is passed through a filter network 24 having a notch rejection characteristic wherein the leakage component and the Doppler spectrum associated with the $J_0$ order or carrier frequency ($\omega_{IF}$) are stripped from the signal. This is indicated by the broken line N, depicted in FIG. 3C. The resulting waveform containing only Doppler first order sideband information and associated zero-speed leakage components is then simultaneously fed into mixing units 25, 26, respectively. Also being fed into each of these mixing units is the local oscillating signal ($\omega_{IF}$) from oscillator 14. Before reaching mixer 26, however, the latter's local oscillating signal is phase shifted 90° in phase shifter 27. By this arrangement, the outputs of mixer units 25, 26 will always be in quadrature relative to each other, that is, they will differ in phase by 90°.

Figure 3D:
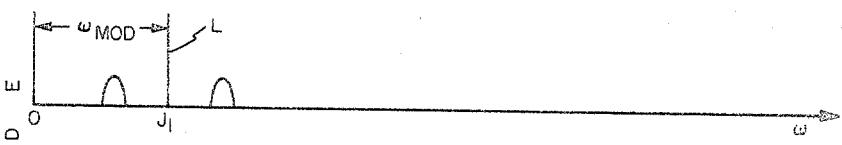

Moreover, as a result of heterodyning the filtered signal of FIG. 3C together with $\omega_{IF}$, each mixer 25, 26, produces a signal which is equivalent to folding the spectrum of FIG. 3C about its carrier frequency point ($\omega_{IF}$) and reducing the carrier frequency to zero as shown in FIG. 3D.

In other words, the demodulation process just described results in a heterodyne dcarrier product theoretically at the zero frequency and a pair of sidebands centered at the modulation frequency. This may be observed in FIG. 3D wherein the sideband pair is shown to actually consist of two fairly broad spectra equally spaced above and below the modulation frequency point, with each spectrum, of course, reflecting the inherent nature of the Doppler return signal. It is significant also that the only signal present at the modulation frequency point itself is the zero-speed leakage spike L.

Figure 4A:
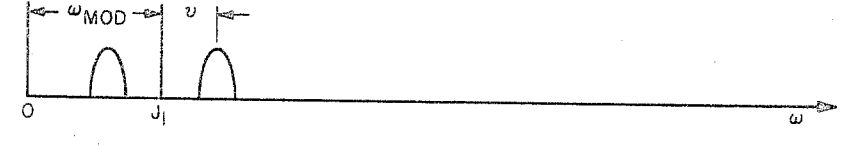
Figure 4B:
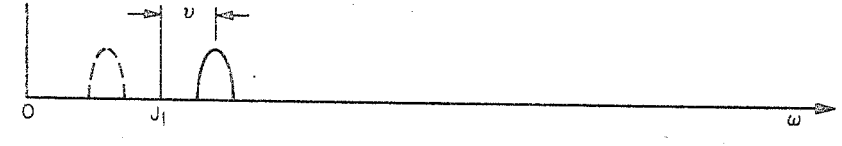

After heterodyning in mixers 25, 26, respectively, Doppler velocity and altitude information contained in the processed signal may be separated into their own channels. Accordingly, as shown in FIG. 1, the sideband pair output signal of mixer 25 is fed simultaneously to a summing junction 28 and to a 90° phase shifter network 38. On the other hand, the output of mixer 26 is fed simultaneously to summing junction 28 and to a second summing junction 61. Thus, when the quadrature related double sidebands are summed in adder 61 after the sideband pair from mixer 25 has undergone an additional 90° phase shift in shifter network 38, an output signal is produced comprising a single sideband having a frequency distribution equal to the frequency distribution in either one of the sidebands in the input signal. The results of this process may be observed by initially referring to FIG. 4A wherein a graphical representation in the frequency domain is shown illustrating the spectral distribution of each input signal to the second summing network 61. In similar fashion, FIG. 4B shows the corresponding output signal after summation. It will be apparent upon comparison of FIG. 4A with FIG. 4B that if the signal depicted in the former were to be fed into the frequency tracker of a conventional Doppler navigator, the tracker would only be able to extract the magnitude of the Doppler shift frequency, $\nu$, but not its sense with reference to directional change. The reason for this is that the tracker cannot distinguish between a negative or positive velocity (e.g., vectoring backwards or forwards, respectively, as in a helicopter) when confronted with a Doppler input comprising double sidebands symmetrically disposed about a reference frequency ($\omega_{MOD}$) under all velocity conditions. This is so because when there is a change in velocity direction such as, for example, from forward to backward, the spectra in FIG. 4A merely exchange positions relative to the reference frequency point in mirror-image like fashion and as a result the frequency tracker cannot tell the difference between the signals before and after the exchange. In contradistinction, however, the single sideband Doppler spectrum illustrated in FIG. 4B behaves asymmetrically relative to the reference frequency $\omega_{MOD}$ and the tracker therefore can utilize this fact to advantage in sensing the velocity vector. That is, the tracker will measure a positive velocity when the single sideband is on one side of the reference frequency point as shown by the solid line in FIG. 4B and likewise, the tracker will sense a negative velocity when the single sideband wanders across the reference frequency point, so to speak, and appears on its other side as indicated by the broken lines in FIG. 4B. In one case, the frequency tracker measures $\omega_{MOD} + \nu$, and in the other case it measures $\omega_{MOD} - \nu$.

This ability to extract single sideband velocity information from the same sideband which ultimately will yield altimetry information also, may best be appreciated when one considers that the radar altimeter according to the present invention may be adapted for complete system integration in a Doppler navigator and thus obviate a costly redundancy of parts. In point of fact, the present altimeter may be utilized as the front end of the navigator as it may simply be plugged into the frequency tracker channel.

As mentioned above, the quadrature related sideband pairs are also fed to summing point 28 wherein a single composite signal is produced identical to that shown in FIG. 3D but for a quadrature phase component which has no effect on the frequency distribution of the signal.

This composite signal is then passed through leakage elimination filter 29 wherein the undesirable leakage spike L is removed and the resulting signal containing only the upper and lower sideband spectra is further amplified.

It is to be noted that both the leakage elimination filter 29 and the $J_0$ filter 24 may be of the broad bandpass type having a center rejection notch which latter may be designed to be as narrow as requirements dictate. Such filters are fully disclosed in co-pending application, Ser. No. 435,666, filed Feb. 26, 1965 and assigned to the assignee of this invention.

Figure 3E:
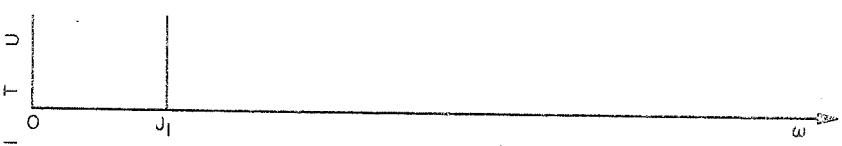
Figure 3F:
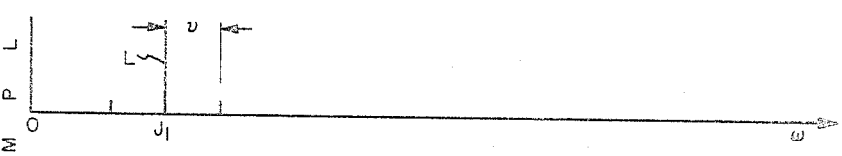
Figure 3G:
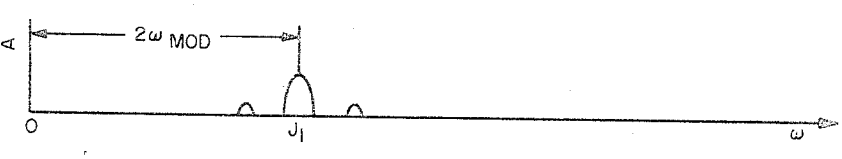

The output of component 29 is then fed into a frequency doubling network 30. The latter which may, for example, comprise a full wave rectifier, intermodulates the sideband pair resulting in an output signal having a frequency twice that of the modulation frequency. This arises from the fact that the two spectra have a unique relationship to each other resulting from the processing in mixing units 25, 26 previously described. Because of the way in which they are generated each spectrum is the mirror image of the other as represented in FIG. 3D. What this really means is that in the time domain, when one spectrum has a frequency separated from the modulation frequency by a certain amount, the other spectrum simultaneously, has a frequency separated from the modulation frequency by the same amount but in the opposite direction. As a result, when these spectra signals are multiplied together in intermodulator or doubler 30 they generate a signal having a sharp line spectrum at a frequency twice that of the modulation frequency, in addition to other cross-product frequencies. This state of affairs is depicted in FIG. 3G.

The intermodulated signal is then fed into a filter 31 sharply tuned to a frequency which is equal to twice the modulation frequency, and which is so narrow band that it excludes noise and Doppler sidebands transmitted and doubled by the intermodulator 30. These doubling and filtering operations thus generate and isolate a signal having a pure single frequency at twice the modulation frequency. This single frequency signal is substantially the only output of filter network 31. It is now applied to a phase detector 34.

The phase of the output voltage of frequency divider 16 is employed as a reference in measuring the phase of the output voltage of filter 31. However, it is well-known that in making phase comparisons the reference voltage should be at the same frequency as the signal being measured. Therefore, the output of frequency divider 16 is doubled in frequency by frequency doubler 32 and thereafter passed through filter network 33 to remove its fundamental frequency component at the modulation frequency. The remaining signal component is at a frequency equal to twice the modulation frequency and this signal is then fed to phase detector 34. A phase shifter (not shown) may be used immediately after filter 33 to compensate for any phase shift undergone by the reference voltage in doubler 32 and filter 33.

The phase detector 34 emits a signal representing, by its amplitude, the difference angle, $\theta$, between the phase of the signal present at the output of filter 31 and the phase of the reference voltage.

The error signal appearing at the output of the phase detector 34 is made up of two components, namely, a component proportional to the external phase delay due to altitude and a component proportional to internal phase delay due to the processing of the received signal itself. The phase detector output signal is then fed through switch 35 into a memory loop 40 whose operation will be described hereinbelow.

Up to this point, the foregoing discussion has related essentially to the NORMAL mode operation of the FM radar altimeter. Now the method of and the means for extracting and removing the internal delay component from the altimetry channel phase detector output signal will be described.

Consider that the system has functioned in the NORMAL mode in the manner discussed above for a finite interval in time, $\Delta T_1$. Now let it be assumed that the altimeter is to operate for an equivalent finite interval in time, $\Delta T_2$, which latter immediately succeeds $\Delta T_1$. Also, in order to distinguish from operation in the NORMAL mode, let the operation of the system during the interval $\Delta T_2$ be arbitrarily referred to as operation in the CALIBRATE mode. Simultaneously with the initiation of the immediately succeeding time interval, $\Delta T_2$, microwave switch 21 is activated thereby short-circuiting the antenna used in conjunction with the altimeter system. The frequency modulated microwave carrier is thereby allowed to leak through coupler 18 and switch 21 directly into mixer 22. Inasmuch as this signal has not been reflected from the ground it contains no spectral Doppler return information and more importantly it includes no external phase delay component corresponding to measured altitude. Actually, the signal entering mixer 22 may be assumed to comprise a transmitter leakage signal of relatively large amplitude. The latter is then processed in the same manner as a normal echo signal would be during $\Delta T_1$. That is, the leakage signal is initially sidestepped by being mixed with the output voltage of single sideband modulator 19 in mixer 22 and subsequently amplified and filtered in components 23 and 24, respectively. It is then fed simultaneously to mixers 25, 26.

It will be recalled that the purpose of these mixers during the interval $\Delta T_1$ was to heterodyne the sidestepped echo signal to a theoretical zero beat frequency and produce a Doppler sideband pair centered at the modulation frequency. However, as already mentioned, the signal appearing at the corresponding point in the time interval $\Delta T_2$ has no Doppler return component. Moreover, the leakage components remaining in the processed signal are to be removed in leakage elimination filter 29 prior to doubling the Doppler sideband pair in intermodulator 30. In addition to this, it is obvious that a large part of the internal phase delay component is generated in the system components responsible for processing the Doppler sideband pair shown in FIG. 3D, namely, the narrow band leakage elimination filter 29, the doubler 30, and the narrow band filter 31.

Therefore, it would be logical to suspect that some means for injecting a simulated Doppler return signal into the system must be provided at this point. This requirement is met by providing a calibrate generator 37 between summing junction 28 and leakage elimination filter 29. The generator 37 includes means for receiving the modulation frequency output $\omega_{MOD}$ obtained from divider 16 and for further dividing this signal to a lower frequency equal to the Doppler shift frequency $\nu$. The generator also includes means for amplitude modulating the output signal of adder 28 with this signal. Since the signal being fed to mixers 25, 26 comprises only the first order zero-speed leakage spikes as shown in FIG. 3C, the output of adder 28 during the CALIBRATE mode comprises a single frequency spike at $\omega_{MOD}$ as shown, for example, in FIG. 3E. Significantly, this signal includes the same quadrature phase component generated in the processed echo signal.

Obviously, the use of two mixers and a phase shifter for producing quadrature related double sideband pairs is essential to the process described previously, namely, the production of a single sideband Doppler velocity signal during the NORMAL mode operation of the altimeter. The dual mixer quadrature technique however, has an equally important function during the CALIBRATE mode. It has been found, using a single mixer and no quadrature, that the heterodyned mixer output signal (FIG. 3E) would at random intervals be lost. This is due to the fact that during the CALIBRATE mode the signal being heterodyned to a zero beat frequency comprises two leakage spikes at $\omega_{IF} \pm \omega_{MOD}$ as shown in FIG. 3C. What this means is that the output signal from a single mixer being folded about $\omega_{IF}$ actually is composed of two components having separately randomly varying phases although this signal appears in the frequency domain as a single frequency signal as shown in FIG. 3E. Now at random intervals, the phases in the two components would oppose each other by 180° electrical and the signal would cancel. However, by introducing a fixed 90° phase difference into the signal this cancellation may be avoided inasmuch as the signal in FIG. 3E would then always have phase components represented by the vector sum $$[\sin\theta + \cos\theta]$$

which, latter could never be zero.

Figure 3H:
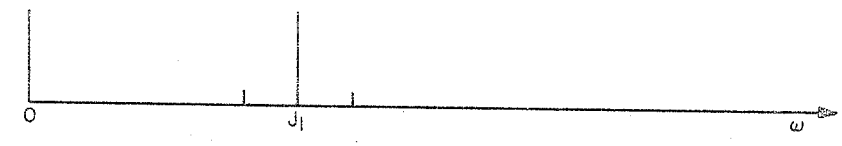

Returning now to events in the CALIBRATE mode, the output of adder 28 is fed to the calibrate generator wherein it is amplitude modulated by the low frequency signal thereby yielding a carrier product at $\omega_{MOD}$ and sidebands at $\omega_{MOD} \pm \nu$. This frequency distribution is represented in FIG. 3F. Note that the calibrate generator output signal (hereinafter referred to as the calibrate signal) is similar to the output signal of adder 28 at a corresponding point in the interval $\Delta T_1$. It is apparent therefore that the calibrate signal will continue to accumulate the same internal phase shift error component accumulated by the echo signal as the latter was processed through the altimeter system during the NORMAL mode. Furthermore, as the calibrate signal passes through doubler 30 it is intermodulated in the same manner as the echo signal. Thus the filter 31 during the interval $\Delta T_2$ produces an output signal having a frequency distribution as shown in FIG. 3H. In other words, it comprises a signal having a single frequency component equal to twice the modulation frequency. Hence, the signal is capable of phase comparison in phase detector 34 with the reference phase available at the output of filter 33. Accordingly, during the interval $\Delta T_2$ the signal appearing at the output of phase detector 34 has an amplitude which is indicative of only the internal phase delay error generated by the system's components per se.

When switch 21 was actuated thus short-circuiting the antenna and initiating the CALIBRATE interval, $\Delta T_2$, switch 35 was also activated connecting the phase detector to the CALIBRATE memory loop 41 and disconnecting it from the NORMAL memory loop 40. As a result, the signals processed by the system during $\Delta T_2$ were stored in the former loop. Now at the initiation of each time interval the information state of each loop is sensed and the results shifted into differential comparator 36. Thus, if the antenna is short-circuited at a rapid enough rate, or stated differently, each time interval is short enough in duration, then it can be assumed that the internal delay generated by the system during two successive intervals remains constant. Hence, at the termination of $\Delta T_1$ the output of the NORMAL memory loop represents the total phase delay of the received echo signal and comprises two components, external delay and internal delay. Similarly, at the termination of $\Delta T_2$ the output of the CALIBRATE memory loop represents the total phase delay related to the calibrate signal. However, this signal comprises only a single component which is equal to the internal phase delay component contained in the NORMAL memory loop output signal. Therefore, it is obvious that if the outputs of both loops are fed to the differential comparator 36 over a period of time equal to the duration of two $\Delta T_1$ the internal phase components will cancel each other and the output signal of the comparator will only include a component reflecting the magnitude of the external delay. The latter, of course, being proportional to measured altitude may then be fed to a conventional altimeter means and the instantaneous altitude during two $\Delta T_1$ be read out aboard the aircraft.

Figure 2:
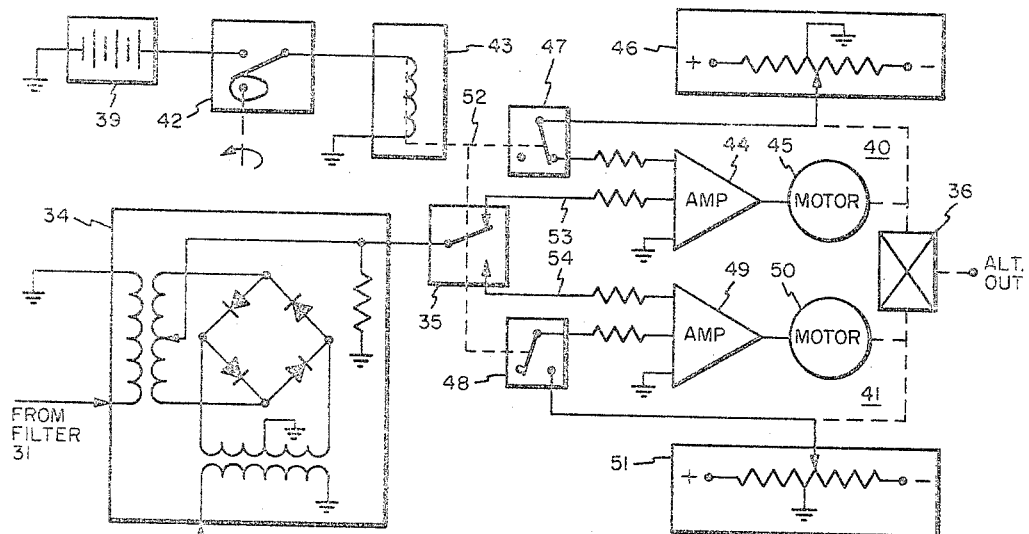
FIG. 2 is a detailed block diagram of each memory loop.

With reference now to FIG. 2, the operation of the memory loops 40, 41 will be described.

A suitable voltage obtained from source 39 is employed to intermittently energize relay 43 by means of interrupter 42. The relay is coupled as shown to a linkage 52 for actuating switch 35 in a cyclic manner so as to periodically switch the output of phase detector 34 between conductors 53 and 54, respectively, and thereby determine the intervals $\Delta T_1$, $\Delta T_2$, respectively. Since the latter have equal durations, the interrupter is designed to control the energization of relay 43 with the result that the latter is energized for a period of time equal to the period of time it is deenergized. By using additional relays in conjunction with the interrupter 43, the calibrate generator 37 and the microwave switch 21 of FIG. 1 are operatively controlled in synchronism with the operation of switch 35. This is indicated in FIG. 1 by the broken line 55.

Assume now that the system is operating in the NORMAL mode and the interval $\Delta T_1$ is being initiated by energization of relay 43. The output of the phase detector 34 which consitutes an error signal proportional to the sum of the internal and external phase delays passes through switch 35 and into conductor 53. The latter then couples this error signal to the input summing network of servo amplifier 44. This amplifier together with servo motor 45, sliding potentiometer 46, and the lock-in switch 47 comprises the NORMAL mode memory loop 40 which it will be recognized is nothing more than a conventional follow-up position servomechanism. That is, the output shaft of servo motor 45 will rotate in response to the amplified error signal and potentiometer 46 will feed back a sufficient voltage to amplifier 44 through closed switch 47 until the error signal is nulled. At this point the servomechanism loop becomes stable and the output shaft of the servo motor has rotated through an angle proportional to the magnitude and polarity of the error signal. This same shaft rotation also serves as one of the inputs to differential comparator 36.

As the interval $\Delta T_1$ terminates and the system switches into the CALIBRATE mode, relay 43 deenergizes thereby switching the phase detector voltage to conductor 54, closing lock-in switch 48, and opening switch 47. The latter occurrence is necessary to lock in the feedback voltage in the feedback loop thereby preventing the same from backing off the servo motor output shaft as the phase detector error voltage is removed from the input network of servo amplifier 44. Also, the calibrate generator 37 is switched on and the microwave switch 21 is activated to short-circuit the antenna's system. The system now is operating in the CALIBRATE mode and $\Delta T_2$ has been initiated. The phase detector error voltage therefore now passes through conductor 54 into the servo amplifier 49. The latter together with servo motor 50, feedback potentiometer 51, and lock-in switch 48 comprises the CALIBRATE memory loop 41 and it, too, is nothing more than a conventional position follow-up servomechanism. In fact, the respective memory loops 40, 41, operate in an identical manner but for one important distinction. That is, of course, that the phase detector error voltage during the CALIBRATE mode interval ($\Delta T_2$) is proportional only to the internal phase delay generated by the system per se. Therefore, during the interval $\Delta T_2$, the output shaft displacement of servo motor 50 (which reflects only the internal delay component) serves as the other input to differential comparator 35. As is well appreciated in the art, a differential comparator has two inputs and one output, the latter comprising the difference between each input. Hence, the output shaft of differential comparator 36 at the end of an interval equal in duration to $\Delta T_1$ plus $\Delta T_2$ will have been rotated by an amount proportional only to the external phase delay component, the internal phase components having been cancelled or washed out by the inherent operation of the comparator 36. The output of differential comparator 36, therefore, constitutes a pure altitude proportionality unperturbed by the internal phase delays generated unavoidably during system processing.

From the foregoing, it is apparent that the instant disclosure relates to sufficient means for accomplishing all of the objects and advantages anticipated by the invention.

While the present invention has been described with a degree of particularity for the purposes of illustration, it is to be understood that all equivalents, alterations and modifications within the spirit and scope of the present invention are herein meant to be included.

What is claimed is:

1. Radar altimeter apparatus comprising:
    means including antenna means for transmitting a frequency modulated signal from a moving object toward a remote scattering surface, said frequency modulated signal being derived from a generated continuous wave signal modulated by an oscillator signal at a predetermined modulation frequency,
    means for receiving the Doppler echo signal resulting from the backscattering of said frequency modulated signal from said surface, said receiving means including means for suppressing the carrier component in said echo signal and for emitting a signal having only upper and lower Doppler spectral components centered at multiples of the modulation frequency,
    first filtering means responsive to said receiving means for isolating only the Doppler spectral components surrounding the modulation frequency,
    intermodulation means coupled to said first filtering means for yielding a signal having a frequency distribution substantially centered at twice the modulation frequency,
    second filtering means responsive to said intermodulation means for obtaining a pure single frequency signal at twice the modulation frequency,
    phase comparison means associated with said second filtering means for obtaining an output signal proportional to the phase difference between said pure single frequency signal and a reference signal of like frequency, said output signal being proportional to the sum of the internal phase delay component accumulated by said echo signal as it is processed through each of said aforementioned means and the external phase delay component produced by the traveling of the frequency modulated signal to and from said surface, and
    means for automatically removing only the internal phase delay component from said output signal.

2. The apparatus of claim 1 in which said last mentioned means comprises:
    control means for short-circuiting said antenna means to directly channel said frequency modulated signal to said receiving means at regularly spaced intervals in time,
    signal generating means responsive to said receiver means for feeding a calibrate signal to said first filtering means, said signal generating means being operable only when said antenna is short-circuited and being inoperable only when said antenna is not short-circuited,
    first memory means for storing the output signal of said phase comparison means when said signal generating means is operable,
    second memory means for storing the output signal of said phase comparison means when said signal generating means is inoperable, and
    differential comparison means responsive to said first and second storage means, respectively, for yielding a signal representing the difference between said output signal obtained when said signal generating means is operable and said output signal obtained when said signal generating means is inoperable.

3. The apparatus of claim 2 further comprising:
    switch means for alternately coupling said first and second storage means to said phase comparison means,
    said switch means being operatively responsive to said control means and being actuatable thereby to couple said first memory means to said phase comparison means in synchronism with the feeding of said calibrate signal to said first filtering means.

4. The apparatus of claim 2 in which said calibrate signal comprises a simulated Doppler echo signal.

5. The apparatus of claim 1 in which said receiving means includes means for sidestepping the Doppler echo signal to an intermediate frequency before suppressing the carrier component therein.

6. In a microwave radio system for measuring the distance between a vehicle and a distance target including:
    means for generating a continuous microwave signal,
    oscillator means for frequency modulating said continuous microwave signal at a preselected modulation frequency,
    antenna-transmitter-receiver means for radiating said frequency modulated signal toward said target, for receiving echoes therefrom, and for producing electrical microwave signals representing said echoes,
    means heterodyning said electrical microwave signal with a local oscillator to produce a signal having zero carrier frequency, said zero carrier frequency including frequency spectra associated with the first order sideband centered at the modulation frequency,
    filter means for segregating said frequency spectra,
    intermodulation means receiving said filter output and emitting modulation products including a sharp single frequency signal having a frequency equal to twice the modulating frequency,
    filter means for isolating said sharp signal frequency signal, and
    phase comparison means for producing an output signal representing the phase difference between said single frequency signal and a reference signal of like frequency,
    said output signal including a phase shift error accumulated during the processing of said electrical microwave signal through each of said aforementioned means, and
    means for automatically removing said phase shift error from said output signal.

7. The microwave radio system of claim 6 wherein said last mentioned means comprises:
    actuatable microwave coupling means for shutting down said antenna and for simultaneously directly routing said frequency modulated signal from said transmitter to said receiver;
    actuatable means responsive to said heterodyning means for deriving a simulated Doppler echo signal and for delivering said simulated echo signal to said first mentioned filter means;
    normally operative means for storing said output signal;
    normally inoperative means for storing said output signal;
    control means for simultaneously: (1) actuating said microwave coupling means, (2) actuating said simulated Doppler echo signal deriving means, (3) rendering said normally operative storage means inoperative, and (4) rendering said normally inoperative storage means operative; and
    differential comparator means responsive to each of said storage means.

8. The microwave radio system of claim 7 further comprising:
    programming means coupled to said control means for actuating the latter at periodically spaced time intervals and for maintaining said control means in the actuated state for a period in time equal to each of said spaced intervals.

9. The microwave radio system of claim 6 further comprising:
   means for sidestepping the carrier frequency of said microwave echo signal to an intermediate frequency before said carrier frequency is heterodyned to a zero frequency in said heterodyning means.

10. Doppler radar apparatus, comprising:
   means for generating a continuous wave signal,
   oscillator means for generating a signal at a predetermined frequency,
   means for modulating said continuous wave signal with said predetermined frequency signal,
   means for transmitting said frequency modulated signal toward a reflecting surface and for receiving echo signals therefrom,
   means for deriving a pair of first order frequency sideband spectra from said echo signals and for suppressing the carrier frequency thereof, said sideband spectra being centered at said predetermined frequency,
   means responsive to said first order frequency sideband spectra for deriving a single frequency signal therefrom proportional to the time delay between said echo signal and a reference frequency obtained from said transmitting means,
   said last mentioned means comprising,
      first filtering means responsive to said pair of spectra for removing the transmitter leakage component therefrom,
      frequency doubler means coupled to said first filtering means for emitting a signal having a frequency component substantially centered at twice said predetermined frequency,
      second filitering means responsive to said doubler means for obtaining a pure single frequency signal at twice the predetermined frequency,
      phase comparison means associated with said second filtering means for obtaining an output signal proportional to the phase difference between said single frequency signal and said reference frequency, said output signal being proportional to the sum of the internal phase delay component accumulated by said echo signal as it is processed through each of said aforementioned means and the external phase delay component corresponding to said time delay, and
   means for automatically removing only the internal phase delay component from said output signal.

11. The apparatus of claim 10 further comprising separate means responsive to said first order frequency sideband spectra for deriving therefrom a single sideband spectral signal proportional to the Doppler frequency shift undergone by echo signal.

12. The apparatus of claim 11 in which said separate means for deriving a single sideband spectral signal comprises:
   second means for deriving a second pair of first order frequency sideband spectra from said echo signals, said second pair being substantially similar to said first mentioned pair but differing in phase by 90°, and
   means responsive simutlaneously to said first mentioned pair and to said second phase shifted pair for producing said single sideband spectral signal.

References Cited

UNITED STATES PATENTS 3,168,735  2/1965  Cartwright _____ 343—14 X

RODNEY D. BENNETT, JR., *Primary Examiner.*

JEFFREY P. MORRIS, *Assistant Examiner.*

U.S. Cl. X.R.

343—9